April 18, 1967    Z. H. BLANKERS    3,314,287
STEP CAPACITANCE WAVE PROFILE RECORDER
Filed July 29, 1964
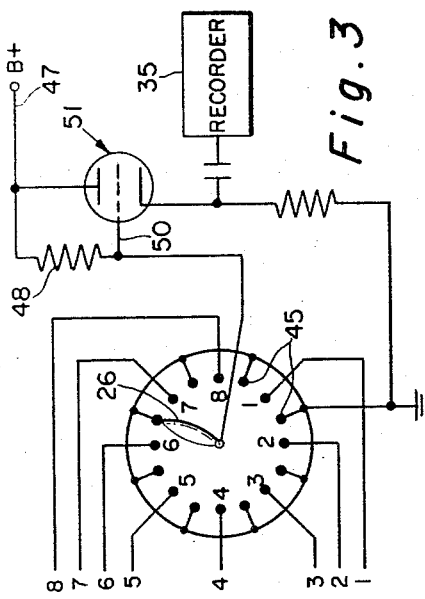
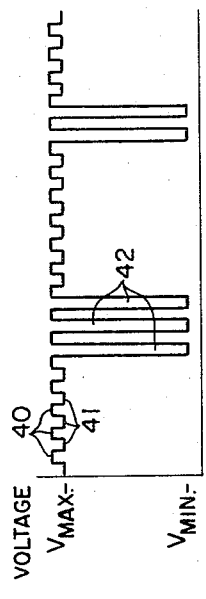
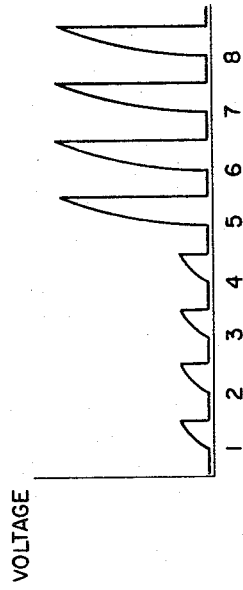
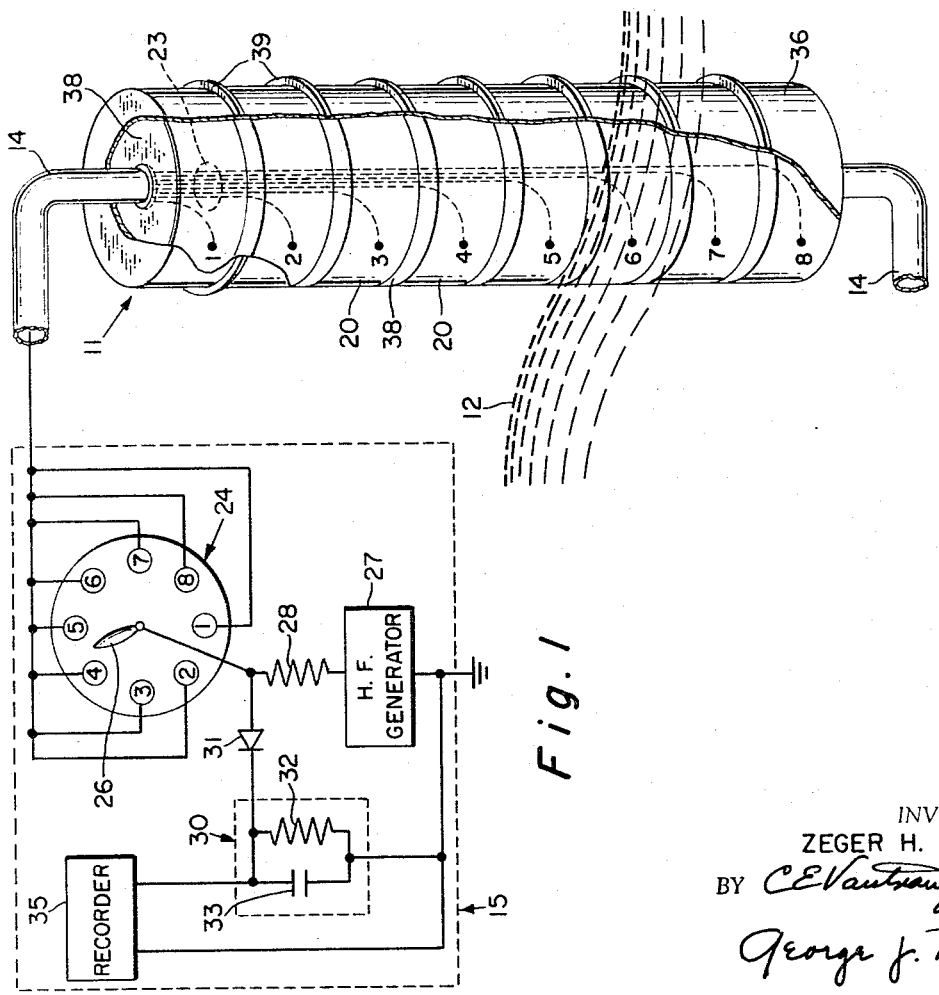
INVENTOR.
ZEGER H. BLANKERS
BY C.E. Vautrain Jr. AGENT
George J. Rubens
ATTORNEY

United States Patent Office 3,314,287
Patented Apr. 18, 1967

3,314,287
STEP CAPACITANCE WAVE PROFILE RECORDER
Zeger H. Blankers, Ventura, Calif., assignor to the United States of America as represented by the Secretary of the Navy
Filed July 29, 1964, Ser. No. 386,097
10 Claims. (Cl. 73—170)

The invention described herein may be manufactured and used by or for the Government of the United States of America for governmental purposes without the payment of any royalties thereon or therefor.

This invention relates in general to wave measuring devices and more particularly to a recording wave gauge which uses a step capacitance type of sensor.

In many fields such as oceanography, military defense and commercial shipping it is desirable and often necessary to know the sea state or wave profile in a particular sea area or in wide areas where activity is planned. This need has been served in the past by a number of mechanically operated wave measuring devices which function primarily by sea action raising a float the motion of which is sampled and recorded in a series of samplings which provide wave data. More recently electronic wave reading and recording devices have included the use of electrode positioned and spaced vertically along a staff or mast which is floated in a vertical posture in the area where wave measurements are desired to be taken. Such electrode devices, sometimes referred to as step recording devices, provide recorded information of the movement of the ocean's surface in response to wave action. These electrode type of wave measuring devices have sensing electrodes which protrude from a partially immersed staff or mast such that they are exposed to salt water. The resutling corrosion is accelerated by hydrolysis. Protruding electrodes also collect sea weed and ocean debris and with such material on them give erroneous readings because of impaired or added current paths. The output of the electrode type device is an analog signal, non-linear, and is also a function of the sea water conductivity such that signals of waves of similar or identical height may vary in different portions of the ocean. All of the foregoing characteristics of present electrode type measuring devices introduce appreciable error in the wave measurements obtained and recorded.

In contract, the present invention provides a step capacitance method of measuring ocean wave profiles which avoids the disadvantages of prior electrode wave measuring devices by, in part, forming electrodes which present no protuberance into the surrounding water, are not contacted by the water and provided an electrical signal which can be easily recorded or telemetered in a form that can be readily analyzed by electronic digital computers.

Accordingly it is an object of the present invention to provide a wave measuring gauge free of debris-collecting protuberances.

It is another object of the present invention to provide a device for measuring ocean wave profiles electronically which device has an output signal which may be readily filtered and clipped for use in digital computers.

It is a further object of this invention to provide a device for measuring ocean wave profiles electrically in which the electrodes are shielded from corrosive action by salt water.

Other objects and many of the attendant advantages of this invention will be readily appreciated as the same becomes better understood by reference to the following detailed description when considered in connection with the accompanying drawings in which like numerals designate like parts throughout and wherein:

FIG. 1 is a perspective view partly cut away and partly schematic illustrating one embodiment of the present invention;
FIG. 2 is a graph depicting sample output signals of the device shown in FIG. 1;
FIG. 3 is a schematic diagram of an alternate form of capacitance detection for use in the embodiment shown in FIG. 1; and
FIG. 4 is a graph illustrating the output signals from the embodiment of FIG. 3.

Referring now to FIG. 1, a mast or staff means for carrying sensing elements, such as wave staff 11, is shown partially immersed or submerged in a medium 12 such as salt water or other electrically conductive medium. Wave staff 11 may be connected by supports 14 to a variety of structures such as piers, stabilized buoys or other structures, not shown, which may be used to position the wave staff in a desired location in the sea or in other bodies of water whose wave profiles are to be obtained. These supporting structures have been omitted since it should be readily apparent that any available variety of stabilized floating or stationary structure may be used. A power and control unit 15 is associated with use of the wave staff 11 and ordinarily would be carried by whatever supporting structure is used. A series of electrically conductive sensing elements or surfaces such as conductive bands 20 are disposed about the periphery of wave staff 11, the bands 20 being separated as shown to provide insulation from one another. Bands 20 are numbered 1–8, inclusive, for ease of reference and are connected individually by connectors 23 to a selective sampling switching means such as commutator 24 in the control unit. The terminals, numbered 1–8, of the commutator correspond to bands 1–8 on wave staff 11. Rotary arm 26 of commutator 24 provides sampling of the bands at a selected rate. The bands and corresponding terminals are energized by electrical wave energy from A.-C. High Frequency (HF) generator 27 fed through resistor 28. Signal information derived from the band 20 is conditioned, i.e. filtered by detector 30 which includes diode 31, resistor 32 and capacitor 33. The filtered signal is then fed to recorder 35 wherein a record of increments of wave motion is made. The generator, detector and recorder are grounded to the surrounding ocean. Bands 20 on wave staff 11 are separated from contact with the ocean by a non-conductive film 36 which surrounds the wave staff in a watertight enclosure.

Wave staff 11, which as stated previously is disposed vertically in the water, in the present embodiment consists of a cylinder of electrically insulative material 38 about which the cylindrical bands 20 are spaced at equal intervals along the longitudinally extending outer surface thereof. A series of ridges 39, preferably of plastic, may be adhered to film 36 intermediate bands 20 to assist in breaking the flow of water as it recedes in order to improve the recovery time of the device. The connectors 23 extend through insulative material 38 within the wave staff and through the upper support member to control unit 15. In the foregoing manner each sensing band 20 is connected to a separate terminal in commutator 24 of control unit 15. Recorder 30 may be a single channel magnetic tape form of recorder which is capable of recording the frequency developed by the sampling rate of the commutator arm 26. Such a sampling rate may be obtained by simply multiplying the number of commutator segments bythe revolutions per second of arm 26.

The graph of FIG. 2 illustrates a signal derived from the embodiment shown in FIG. 1 using a sampling rate of 1800 cycles per second. In this embodiment, the parameters chosen were a wave staff having a length of 15 feet and a diameter of 2 inches and bands 2 inches in width, extending longitudinally along the wave staff, and spaced one-half inch apart. Each band 20 had a 10 megohm resistance to sea water and a .001 microfarad capacitance to sea water. The interwiring capacitance of each band when out of water was approximately .0002.

Although for simplicity only eight bands are shown on wave staff 11 in FIG. 1, a total of 90 bands, corresponding to 90 segments on the commutator, were used in the preliminary embodiment. A HF generator frequency of 100 kilocycles and a voltage of 10 volts were other parameters used, as well as a 50,000 ohm resistance for resistor 28, a 1N34 diode for diode 31, a 50,000 ohm resistance for resistor 32 and a .001 mdf. capacitance for capacitor 33. The recorder has a frequency response of from 500 to 3,000 cycles per second. The parameters cited produced the signals shown in FIG. 2 in which figure it is to be noted that pulses 42 represent bands 20 which are totally submerged, baseline portions 40 represent make before break positions of the commutator arm, and pulses 41 represent samplings of sensor bands 20 which are out of the water.

An alternate component of the device is shown in FIG. 3 which illustrates a time-constant method of detecting the capacitance of each sensing band on the wave staff. In the embodiment of FIG. 3, the commutator terminals are interspersed by grounded terminals 45, and the commutator arm 26 is connected in parallel with a D.C. source 47 through resistor 48 and grid 50 of a cathode follower, vacuum tube 51. Such a high impedance matching device is necessary to prevent charging circuit loading. A typical waveform for one revolution of the commutator arm in the embodiment of FIG. 3 is shown in FIG. 4.

In FIG. 2, reading from the left of the graph, the water levels sampled were between sensing bands 5 and 6 on the first rotation, between sensing bands 6 and 7 on the second rotation, and so on. The graph of FIG. 4, which is for a single rotation of the commutator arm in the embodiment of FIG. 3, illustrates a sampling wherein the water level was between bands 4 and 5.

In operation, sampling of the bands in FIG. 1 is accomplished by rotating arm 26 on commutator 24 at a desired rate, with the arm passing through three different electrical states during each full rotation. These states are, first, when the arm samples a sensing band that is under water and which in such instances has a high capacitance and represents a low capacitive reactance such that a high frequency voltage drop will appear across resistor 28. Second, when commutator arm 26 samples a band of low capacitance, i.e. one which is out of the water and which represents a high capacitive reactance of interwiring capacitance only, a large voltage drop will appear on the commutator arm and a negligible voltage drop across resistor 28. Third, when the commutator arm is in the break before make position the voltage developed thereon will be slightly higher than that developed when the arm is sampling a band above water due to the fact that the capacitance is negligible because the arm is in a non-sampling position. The commutator arm thus samples a varying high frequency voltage level which is detected by detector 30 and recorded by the tape recorder 35.

Typical detecting signals representing two revolutions of commutator arm 26 with a number of sensing bands under or partly in water are shown in FIG. 2. The resulting signal bursts, which occur under operating conditions wherein at least some of the bands are submerged or some are out of the water, provide signals in digital form which may be directly used in a computer. That is, the square wave pulses shown in FIG. 2, or the peaked pulses shown in FIG. 4 may be recorded directly on the magnetic tape of a tape recorder, and when played back the signal from the recorder will appear closely as a series of sine waves. By simple digital techniques, a number of sine wave cycles representing bursts of the recorded wave profile data may be detected by a digital computer. By properly programming a computer to determine the number of cycles difference in a series of bursts, the maximum and/or average wave height will be automatically provided. Since the wave height information is recorded with respect to time, a digital computer may also be programmed to automatically provide the frequency spectrum and fundamental wave composition.

Although a selected set of design parameters have been listed for the components of the embodiment described, it will be appreciated that these parameters may be varied to conform to a desired application. In order to promote rapid shedding of water from the external surfaces of the wave staff it is preferably provided with a coat of silicone grease.

An alternate method of detecting the capacitance of each sensing band the wave staff as set forth in FIG. 3 provides a time-constant measurement which eliminates the requirement of a detector but requires the addition of a high impedance matching device such as the cathode follower shown in FIG. 3. In the time-constant method, capacitance detection is accomplished by charging each sensor band from D.-C. source of potential 47 through the commutator arm and resistance 48. In this embodiment, the bands above water will charge through resistor 48 to a much higher voltage for a specified charging time than will those below the water surface. The terminals of the commutator alternate with grounded terminals rendering make before break switching most desirable for the time-constant method of detecting because each sensor is discharged both after and prior to being charged.

The present invention thus provides a step capacitance recording wave profile measuring device in which, among other features, the electrical circuit is not exposed to salt water thereby eliminating corrosion, and spurious readings are avoided by having sensing elements which do not protrude into the water thus precluding sea weed or debris from being entangled therewith. Wave profile information also may be telemetered in a simple manner since the pulse signal product of the device is in a form which facilitates reduction by electronic digital data computers.

The present invention provides a much improved time response over other versions of incremental wave measurement devices, and in addition provides an overall accuracy which is distinctly superior to other types of machines.

Obviously many modifications and variations of the present invention are possible in the light of the above teachings. It is therefore to be understood that within the scope of the appended claims the invention may be practiced otherwise than as specifically described.

I claim:

1. A device for determining ocean wave profiles comprising:
    a wave staff arranged to be vertically disposed at the ocean's surface;
    a plurality of conductive sensing bands spaced at equal intervals longitudinally along the outer surface of said wave staff;
    a commutator having a rotary arm and at least as many terminals as there are sensing bands;
    a plurality of conductive connectors disposed within said electrical insulation material;
    each of said connectors connecting one of said bands to a respective one of said terminals;
    a high frequency generator having its output terminal connected to the rotary arm of said commutator through a resistor in series therewith;
    a detector connected between said resistor and said rotary arm;
    a recorder connected to the output terminal of said detector; and said sensing bands being separated from contact with the water by covering means which forms a capacitive coupling between each band and the water; whereby when said staff is partially submerged in the ocean the capacitance of each sensing band to the sea water will vary in relation to whether the band is above or below the surface of the water, and by recording information representative of the high voltage of non-submerged bands and of the low voltage of submerged bands, successive samplings of the bands will provide wave profile information.

2. The device as defined in claim 1 wherein the frequency of the signal from said high frequency generator is of the order of from 60 to 800 kilocycles per second.

3. The device as defined in claim 1 wherein said detector includes a diode series connected between said commutator and said recorder and an RC low pass filter parallel connected between said recorder and a ground to the ocean.

4. The device as defined in claim 3 wherein the frequency of the signal from said high frequency generator is of the order of from 60 to 800 kilocycles per second.

5. The device as defined in claim 1 and further including a coating of silicone grease over said covering means to promote rapid shedding of sea water from the wave staff.

6. The device as defined in claim 5 and further including ridge means disposed around said wave staff at regularly spaced intervals therealong so as to interrupt the laminar flow of sea water as it recedes down said wave staff.

7. A device for determining ocean wave profiles through step capacitance measurement comprising:
   a wave staff vertically disposed at the ocean surface where wave data is to be obtained;
   a plurality of conductive sensing surfaces spaced one above the other on said wave staff;
   said sensing surfaces conforming to the contour of the wave staff so as to promote rapid drainage of sea water therefrom;
   said sensing surfaces electrically insulated from one another and from said wave staff;
   a commutator having a rotary arm and at least as many terminals as there are sensing surfaces;
   a plurality of connectors at least partially disposed within said wave staff and connecting individual sensing surfaces to respective terminals of said commutator;
   a high frequency generator having its output terminal connected to the rotary arm of said commutator through a resistor in series therewith;
   a D.-C. source of potential resistively coupled to the arm of said commutator for charging selective sensing surfaces;
   said commutator having grounded terminals intermediate each of said terminals for discharging each sensing surface both prior to and after charging;
   high impedance matching means connected across said D.-C. source and the arm of said commutator for preventing loading of a charging circuit;
   a recorder connected to the output terminal of said high impedance matching means; and
   said sensing surfaces being separated from contact with the water by covering means which forms a capacitive coupling therebetween;
   whereby when the wave staff is partially submerged in the ocean the capacitance of those sensing surfaces above the water surface will charge to a higher potential than the sensing surfaces below the water surface thereby presenting for recordation information indicative of changes in sea level in response to wave action.

8. The device as defined in claim 7 wherein the frequency of the signal from said high frequency generator is of the order of from 60 to 800 kilocycles per second.

9. The device as defined in claim 7 and further including a coating of silicone grease over said covering means to promote rapid shedding of sea water from the wave staff.

10. The device as defined in claim 9 and further including ridge means disposed around said wave staff at regularly spaced intervals therealong to interrupt the laminar flow of sea water as it recedes down said wave staff.

References Cited by the Examiner

UNITED STATES PATENTS

| | | | |
|---|---|---|---|
| 2,230,137 | 1/1941 | Ewertz | 73—304 |
| 2,868,015 | 1/1959 | Haropulos | 73—304 |
| 3,010,320 | 11/1961 | Sollecito | 73—304 |

OTHER REFERENCES

Upham, S. H.: Electric Wave Staff (Hydro Office Model MK 1) U.S. Hydrographic Office Technical Report #9, Washington, D.C., March 1955, FIGS. 1, 2 and 4 relied on, pages 1, 4, 8, and 15 relied on.

Oceanographic Instrumentation, U.S. Navy Hydrographic Office, October 1960, Washington, D.C., pages VII–9 and VIII–10 relied on.

RICHARD C. QUEISSER, *Primary Examiner.*

J. J. SMITH, *Assistant Examiner.*